Patented Jan. 5, 1937

2,066,331

UNITED STATES PATENT OFFICE

2,066,331

CHEMICAL PRODUCTS AND PROCESSES FOR PRODUCING SAME

Wallace H. Carothers and Arnold M. Collins, Wilmington, and James E. Kirby, Arden, Del., assignors to E. I. du Pont de Nemours & Company, Wilmington, Del., a corporation of Delaware No Drawing. Application January 25, 1936, Serial No. 60,883

26 Claims. (Cl. 260—2)

This invention relates to modified halogen-2-butadiene-1,3 (for convenience hereinafter referred to as "haloprene") polymers. More particularly, it relates to polymerization of the haloprenes, especially chloro-2-butadiene-1,3 (for convenience hereinafter referred to as "chloroprene") in the presence of compounds containing an activated carbon-carbon double bond.

This application is a continuation-in-part of an application of Carothers, Collins and Kirby, Serial No. 665,554, filed April 11, 1933, and now matured into U. S. Patent No. 2,029,410. U. S. Patent 1,967,862 also has a bearing on this application, since it discloses reaction of haloprenes with compounds containing an activated carbon-carbon double bond to form monomeric cyclic products (Diels-Alder reaction). The present invention employs some of the same starting materials. The patent is, however, limited entirely to the formation of monomeric products and in each example, an antioxidant is used to prevent polymerization of the haloprene. No mention is made of the formation of interpolymers.

It is also known that haloprenes, that is, compounds of the general formula

in which X represents halogen, polymerize readily to rubber-like products. Unless the polymerization is discontinued before 20–40% has polymerized, or unless the polymerization is modified, non-plastic products are generally obtained which cannot be milled satisfactorily. Another defect of the unmodified haloprene polymers is that they tend to stiffen on aging. This stiffening or freezing takes place slowly at ordinary temperatures and quite rapidly at temperature below 10° C.

An object of this invention is to prepare new and useful compositions from haloprenes. Another object is to produce new polymers of rubber-like or resin-like character from haloprenes. Still another object of this invention is to convert haloprenes into polymers which show little or no tendency to stiffen or freeze on aging. A further object is to prepare plastic haloprene polymers in good yield. A more specific object is to polymerize haloprenes in the presence of compounds containing an activated carbon-carbon double bond. A still more specific object is to polymerize chloroprene in the presence of compounds containing an activated carbon-carbon double bond and to produce polymers of chloroprene of the types described for the haloprenes broadly. Other objects will appear hereinafter.

These objects are accomplished by polymerizing a haloprene in the presence of a polymerizable compound containing an activated carbon-carbon double bond. By a compound containing an activated carbon-carbon double bond we mean a compound of the class consisting of alpha, beta-unsaturated aldehydes, ketones, acids, their esters, anhydrides, and nitriles. The preferred haloprene is chloroprene.

It has been found that polymeric products of rubber-like or resin-like properties can be prepared almost to the exclusion of products of the type described in U. S. Patent 1,967,862, referred to above, by polymerizing a haloprene in the presence of a compound of the class consisting of alpha, beta-unsaturated aldehydes, ketones, acids, their esters, anhydrides, and nitriles. Moreover, it has been found that polymers of widely different character can be obtained by varying the conditions of the polymerization and the ratio of the haloprene to the unsaturated compound. It is possible to prepare high yields of plastic haloprene polymers. The rubber-like polymers prepared according to the methods of this invention show much less tendency to stiffen than unmodified haloprene polymers.

The present invention, therefore, is concerned with the polymerization of haloprenes in the presence of compounds containing an activated double bond between two carbon atoms to produce polymeric products which, as is indicated hereinafter, are believed to be interpolymers. The invention is described in more detail with reference to the preferred haloprene, chloroprene.

The methods of causing chloroprene to polymerize in the present invention do not differ from those set forth in earlier chloroprene applications and patents, but the particular method chosen will depend on the nature of the added unsaturated compound and the type of product desired. For example, the polymerizaton may be carried out by the method of U. S. Patent 1,950,436 (1934) in which plastic polymerizable polymers are obtained, or the mixture may be polymerized in aqueous emulsion as shown in U. S. Patent 1,967,-861 (1934) to obtain a synthetic latex having desirable properties. Any of the catalysts described in previous chloroprene applications and patents may be used, and the mixture may be polymerized in the presence or absence of any of the following: light, heat, air or oxygen, inert solvents, or diluents. Pressures ranging from less than 1 to 6000 atmospheres may be employed.

The invention is more fully illustrated by the following examples in which the term "parts" refers to "parts by weight".

Example 1

A solution of 20 parts of acrylic nitrile in 80 parts of chloroprene was placed in a bottle of ordinary soft glass and exposed to the light from a Cooper-Hewitt lamp for 18 hours at about 27° C. After this length of time, the solution was very viscous and contained about 25% of polymer. It was poured into alcohol and the precipitated plastic mass thoroughly washed with alcohol and dried by milling on cold rolls. The product contained nitrogen, indicating the presence of polymerized acrylic nitrile. The plastic interpolymer was compounded according to the following formula and cured in a mold at 125° C. for 25 minutes.

| | Parts |
|---|---|
| Polymer | 100 |
| Phenyl beta-naphthylamine | 1.5 |
| Zinc oxide | 10.0 |
| Benzidine | 1.0 |
| Stearic acid | 1.0 |

The cured product was strong and elastic and closely resembled soft vulcanized rubber. It remained pliable for more than five weeks at 10° C., whereas a polymer prepared similarly but without the acrylic nitrile stiffened in 28–48 hours at 10° C.

Example 2

A solution of 5 parts of methacrylic nitrile in 45 parts of chloroprene was emulsified in 50 parts of 2% sodium oleate solution with the aid of high-speed stirring. The emulsion was stored at a temperature of 10° C. for 20 hours during which time 78% of the polymerizable ingredients polymerized. Analysis of the interpolymer at this stage showed the presence of 1.37% nitrogen equivalent to 6.55% methacrylic nitrile. One part of ethyl beta-naphthylamine was then added to the synthetic latex in the form of an aqueous dispersion to act as an antioxidant for the polymer. Approximately 5 parts of 3% ammonium hydroxide solution was also added to stabilize the emulsion. A film of the latex was flowed on a porous plate. After most of the water had soaked into the plate there remained a film of rubber-like polymer. The film was cured by heating at 70° C. for 20 hours. The finished product resembled soft vulcanized rubber. It had a tensile strength of 1100 lb./in.² and an elongation at break of 1140%. It remained pliable during storage at 10° C. for several months, whereas unmodified chloroprene similarly polymerized became stiff within a day at 10° C.

Similarly, 150 parts of chloroprene and 50 parts of methyl methacrylate were emulsified in 800 parts of a 1% aqueous solution of the sodium salt of sulfated oleyl acetate. The emulsion was kept at 40° C. for 1.5 hours, then treated with 2 parts of phenyl beta-naphthylamine and coagulated by the addition of sodium chloride solution. The coagulum was washed with warm water between corrugated rolls and finally dried by milling on a rubber mill. 146 parts of a plastic, rubber-like product were obtained. 100 parts of this, when compounded with 5 parts of zinc oxide, 10 parts of magnesium oxide, and 5 parts of rosin and cured for 20 minutes at 153° C., gave tough but pliable material resembling vulcanized natural rubber and having a tensile strength of 2750 lb./sq. in. and an elongation at break of 1100%.

Rubber articles prepared from the modified chloroprene latex, like those of unmodified chloroprene latex, require no vulcanization and the modified rubber retains the desirable properties indicated above. The latex is admirably suited to the preparation of coated and impregnated cloth and paper because of the softness and pliability of the synthetic rubber.

Example 3

A mixture of 20 parts of chloroprene, 20 parts of methyl vinyl ketone, and 0.4 part of benzoyl peroxide was heated at 60–75° C. for 5 hours and then distilled under reduced pressure. In this way 20 parts of monomer was recovered and 2 parts of chloro-4 (or 5) -tetrahydro-1,2,3,6-acetophenone (Diels-Alder type product) was obtained. The residue consisted of 17 parts of soft, rubber-like resin. Analysis showed that this residue contained 28.13% chlorine, indicating that it contained approximately 70% polymerized chloroprene and 30% polymerized methyl vinyl ketone. The product differed from a physical mixture containing polymerized chloroprene and polymerized methyl vinyl ketone in this ratio. For example, polymerized methyl vinyl ketone can be extracted from the physical mixture with acetone. Polymerized methyl vinyl ketone cannot be removed from the interpolymer in this way, indicating that the chloroprene and methyl vinyl ketone are chemically combined in the interpolymer. The interpolymer is insoluble in acetone but soluble in toluene.

When methyl vinyl ketone and chloroprene are heated together under the above conditions in the presence of an antioxidant, such as pyrogallol, the chief product is the chloro-tetrahydro-acetophenone mentioned above. In the absence of catalysts and antioxidants mixtures of chloroprene and methyl vinyl ketone give both the substituted acetophenone and interpolymer; the ratio of the monomeric to the polymeric product is dependent upon the temperature and the ratio of chloroprene to methyl vinyl ketone. At 25° C. an 8:4 mixture of chloroprene and methyl vinyl ketone gives approximately equal amounts of the monomeric condensation product and interpolymer. The nature of the interpolymer is dependent upon the percentage of chloroprene present and upon the polymerization conditions. When methyl vinyl ketone is the major constituent, the interpolymers are soft resins having good adhesive properties. When a relatively small amount of methyl vinyl ketone is present (less than 10%), a plastic rubber-like product is obtained which has excellent milling properties. By polymerizing chloroprene in the presence of 5–10% of methyl vinyl ketone, it is possible to obtain a higher yield of plastic polymer than can be obtained with chloroprene alone. This is illustrated in the following example.

Example 4

A solution of 5 parts of methyl vinyl ketone in 95 parts of chloroprene was allowed to stand at room temperature for five days. The colorless, highly viscous mixture obtained was treated with methanol. After thorough washing, the interpolymer was dried by milling on cold rolls. Fifty-five parts of plastic benzene-soluble polymer was obtained in this way. Chloroprene polymer prepared in the absence of methyl vinyl ketone under identical conditions until a 55% yield is obtained is elastic, relatively insoluble in benzene, and does not mill satisfactorily. The interpolymer resembled that described in Example 1.

Example 5

A mixture of 72 parts of chloroprene, 8 parts of methyl vinyl ketone, and 0.8 part of benzoyl peroxide was emulsified in 80 grams of a 2% solution in water of the sodium salts of the sulfuric acid reaction products of a mixture of long-chain alcohols (principally cetyl and stearyl) some in the form of sulfonates and some in the form of sulfates. The emulsion was stored at 0–10° C. for 24 hours. It was then stabilized by the addition of 8 parts of 3% ammonium hydroxide solution and 1.5 parts of ethyl beta-naphthylamine in emulsion form. Films of the latex were prepared as described in Example 2 and cured by heating for 17 hours at 70° C. The films were strong and elastic, resembling soft, vulcanized rubber. They had a tensile strength of 1675 lb./in.$^2$ and an elongation at break of 1400%. The films remained pliable at room temperature for several months, whereas control films prepared from unmodified chloroprene latex rapidly stiffened.

Other alpha, beta-unsaturated ketones may be used in place of methyl vinyl ketone. A latex prepared from chloroprene and benzal acetone in a 9:1 ratio gave a more pliable product than that obtained from chloroprene alone, but less pliable than that obtained when methyl vinyl ketone is used.

Example 6

A solution of 10 parts of ethyl fumarate in 40 parts of chloroprene was emulsified in 50 parts of 2% sodium oleate solution and the emulsion allowed to polymerize for 48 hours at 0–10° C. The emulsion was stabilized and a film prepared as in Example 2, except that phenyl beta-naphthylamine was used as the antioxidant. This film, like those of interpolymers previously described, had good strength and elasticity and remained pliable longer than films from emulsions of chloroprene alone. It also had better tear resistance.

Similar results were obtained by using other alpha, beta-unsaturated esters, e. g., ethyl acrylate, and methyl methacrylate, in place of the ethyl fumarate.

Example 7

A solution of 5 parts of methyl acrylate in 95 parts of chloroprene was exposed to the light of a Cooper-Hewitt lamp for two days at room temperature. The resultant polymer was washed and cured as described in Example 1. The cured product resembled vulcanized rubber. It was readily pliable, had a tensile strength of 1650 lbs./sq. inch, and an elongation at break of 920%.

Example 8

A soft glass bottle containing 98 parts of chloroprene and 2 parts of acrolein was exposed to the light of a Cooper-Hewitt lamp for 24 hours at about 30° C. The product was washed and cured as described in Example 1. The product had good tensile strength and showed less tendency to stiffen than unmodified chloroprene polymer.

Example 9

A solution of 12 parts of crotonaldehyde in 108 grams of chloroprene was emulsified in 120 parts of 2% sodium oleate solution by the aid of high speed stirring. The emulsion was stored at 10° C. for 24 hours and then stabilized by the addition of 12 parts of 3% ammonium hydroxide solution and 2 parts of ethyl beta-naphthylamine. Films were prepared from the emulsion in the usual way and cured by heating at 75° C. for 18 hours. The films had a tensile strength of 1950 lbs./in.$^2$, an elongation at break of 940%, and remained pliable for several months when stored at 10° C. Control films prepared from unmodified chloroprene latex similarly prepared and cured had a tensile strength of 1700 lbs./in.$^2$, an elongation at break of 760%, and became stiff within a few hours when stored at 10° C.

The examples describe the interpolymerization of chloroprene with various alpha, beta-unsaturated aldehydes, ketones, acids, their esters, anhydrides, and nitriles. In addition to the specific compounds mentioned in the examples, other polymerizable compounds of this class may be used. As examples may be mentioned ethyl vinyl ketone, methyl propenyl ketone, methyl isopropenyl ketone, phenyl vinyl ketone, ethylidine acetone, cinnamic aldehyde, amyl acrylate, butyl acrylate, propyl methacrylate, ethyl maleate, methyl itaconate, ethyl cinnamate, methyl crotonate, maleic anhydride, as well as the following methacrylates and the corresponding acrylates, etc., methyl methacrylate, isobutyl methacrylate, octyl methacrylate, stearyl methacrylate, naphthenyl methacrylate, abietyl methacrylate, cyclohexyl methacrylate, phenyl methacrylate, beta-dimethylaminoethyl methacrylate, beta-piperidyl ethyl methacrylate, and beta-dicyclohexylaminoethyl methacrylate (these new compounds and their polymers are disclosed in copending applications of Graves, Serial No. 21,807, filed May 16, 1935, and Harmon, Serial No. 21,810, filed May 16, 1935). Although chloroprene is the haloprene cited in the foregoing examples, other haloprenes, such as bromoprene and iodoprene, may be used in place of chloroprene. The broad scope of this invention includes interpolymerization of one or more haloprenes with one or more polymerizable compounds containing an activated carbon-carbon double bond.

As is apparent, the preferred haloprene is chloroprene. The preferred unsaturated compounds in the presence of which chloroprene is to be polymerized are the lower molecular compounds of the various types. Preferred classes of compounds are those containing the acrylic radical such as acrylic nitrile, methacrylic nitrile and methyl methacrylate, also the alkyl vinyl ketones, particularly methyl vinyl ketone. Good results have also been obtained with crotonaldehyde.

It has been inferred above that it is an object of this invention to modify the properties of haloprene polymers. It will be obvious that a further object is to confer on the polymers of unsaturated compounds containing an activated carbon-carbon double bond the properties of haloprene polymers. The invention, therefore, is not limited to the proportions set forth in the examples and the amount of haloprene in the unpolymerized mixture or of the haloprene polymer in the polymerized mixture may vary from 1% to 99% of the total or even more widely so long as an appreciable amount of the haloprene and of the unsaturated compound is present. Thus it is possible to prepare products having preselected properties by choosing the proper proportion of constituents.

Although the proportions of the various constituents exhibit a marked influence on the final product, they do not completely determine its properties which, as has been stated, are dependent as well on the conditions of polymerization. Many variations in these conditions have already been discussed. In addition, however, the conditions may be further varied by using a continuous flow method of polymerization, such as is described in U. S. Patent No. 1,867,014 instead of using a batch process as indicated in the examples. Diluents and solvents, such as toluene, carbon tetrachloride, etc., may be used in the preparation of the interpolymers either alone or in combination with dispersions of the materials which are polymerized. The solvents used may be either solvents or non-solvents for the polymerized material.

Temperatures ranging from 0° to 75° C. are mentioned in the examples and, although this is a preferred range, the invention is not so limited. It will be noted that temperatures ranging from 0° C. to 10° C. and from there up to 30° C. are most frequently used, particularly where chloroprene predominates. Useful products may, nevertheless, be obtained when using higher or lower temperatures than any of those mentioned. These temperatures are, however, preferred only for the first polymerization step. The curing of the compounded polymer preferably takes place at about 125° C., although variations from this temperature are also permissible.

Although only alkaline dispersions are illustrated by the examples the broad invention is not so limited. Acid dispersions are also contemplated. The dispersions may be modified by the addition of suitable solvents, both high and low boiling, acid acceptors such as proteins, catalysts, inhibitors, etc. Of course, inhibitors should not be added in substantial amounts at the start of the polymerization for in that event, as disclosed on page 2, the chief product obtained is a monomeric addition product instead of a polymer. Other modifications include polymerization in dispersion media other than water.

Time is an important factor in both the first polymerization step and the curing. The examples indicate that the time of exposure to the polymerizing influence is by no means fixed, although the time of exposure does, to a large extent, determine the properties of the final product. No exact times can be given, however, in view of the fact that the stage of polymerization reached in a given time depends also to a large extent on other factors discussed herein. The time required to produce a given product can, of course, be determined by polymerizing a test sample under selected conditions and observing the nature of the product at frequent intervals as will be obvious to one skilled in the art.

While the rate of polymerization appears to be favorably affected by the presence of oxygen, polymerization may be carried out in the substantial absence of oxygen. Interesting variations in the final product may in this way be produced.

In the preparation of emulsions, as described above, the invention is not limited to the emulsifying agents already mentioned nor to the quantities employed in the examples. Any emulsification agent appears to function satisfactorily when used in sufficient quantity. The broad classes illustrated above, i. e., the alkali metal oleates and the fat alcohol sulfates or sulfonates or their derivatives as well as the soluble salts of the alkyl naphthalene sulfonic acids, quaternary ammonium salts containing long-chain saturated hydrocarbon radicals and related compounds, will be found to function satisfactorily. The quantity of each to be used may, in general, be determined from their known effectiveness in other similar uses.

In the examples, the unsaturated compounds were added to the chloroprene prior to polymerization. This method may be varied, however, by adding the compound containing the activated carbon-carbon double bond to the chloroprene during its polymerization or by adding the chloroprene to the partially polymerized compound containing the activated double bond and then continuing the polymerization. The polymerizations of this invention may also be carried out in the presence of other polymerizable materials, e. g., vinyl compounds, and film-forming materials, such as resins, cellulose derivatives, plasticizers, drying oils, etc.

The conditions selected for polymerizing chloroprene with a given unsaturated compound containing an activated carbon-carbon double bond will depend upon the ease with which the latter compound polymerizes and upon the type of product desired. In general, use of solvents, polymerization catalysts, and elevated temperatures, leads to the formation of low molecular weight soluble polymer. Interpolymers containing a preponderance of chloroprene are usually rubber-like.

As already stated, it is possible by a suitable choice of conditions of polymerization and types and amounts of interpolymerizing ingredient or ingredients to obtain products containing polymerized chloroprene having most diverse properties. It is not possible to draw any exact generalizations concerning the properties of these products, but it may be said that when polymerized chloroprene predominates (50% or more) the products are usually rubber-like; but if the added ingredients are present in larger amounts, the product will resemble those ingredients (or their polymers) except that it generally has a toughness and elasticity similar to that of polymerized chloroprene. The products will be seen to range from viscous oils to strong plastic masses, elastic extensible rubber-like materials, tough resinous masses, or hard brittle resins. Some of them have properties which make them very useful as rubber substitutes for the preparation of molded chips, coated and extruded articles, while others are valuable as impregnating and film-forming materials. Still others are useful as adhesives.

The properties of the product of the polymerization also vary with the extent to which polymerization is permitted to take place. It may be stopped at an intermediate stage to isolate a plastic product which may be compounded and/or molded and cured. Alternatively, it may be carried to a more advanced stage at which a less plastic or non-plastic product is obtained.

The products formed by polymerizing chloroprene in the presence of unsaturated compounds containing an activated carbon-carbon double bond are often quite different from polymers of either of the two individual unsaturated compounds. In addition, the products differ from those obtained by mechanically mixing polymerized chloroprene with polymers of the other unsaturated compounds. In fact, it is sometimes impossible to prepare homogeneous mixtures or solutions of the separately prepared polymers due to lack of solubility, plasticity, and the like.

Products obtained by polymerizing chloroprene in the presence of another polymerizable compound have been referred to as "interpolymers" and the process is termed "interpolymerization". By defining the terms in this way, it is not intended that the invention be limited to claiming that interpolymers are necessarily chemical combinations of the two polymerizable materials. In certain instances, however, data has been presented to show that this is actually the case.

Owing to the fact that products of widely different properties can be prepared by the methods of the present invention, the products have many applications. This invention is especially useful in the preparation of rubber-like polymers which show no tendency to stiffen on aging. In this respect, the interpolymers have a marked advantage over ordinary haloprene polymers. The products, depending upon their properties, may be used as rubber substitutes, impregnating agents, adhesives, sizing compositions, molding ingredients, coating compositions, etc. In applying the products of this invention it is often desirable to admix them with pigments, dyes, antioxidants, and other modifying agents such as resins, plasticizers, cellulose derivatives, rubber, various synthetic rubbers, oils, fillers, etc., and the use of such ingredients will be obvious to those skilled in the art relating to rubber, resins, gums, drying oils, etc.

Another advantage of the present invention is that it provides a method for preparing plastic haloprene polymers in good yield. When haloprenes are polymerized in the absence of other ingredients, the polymerization must be stopped before 20-40% of the haloprene has been polymerized or a non-plastic product is obtained which cannot be milled. By the methods of this invention much higher yields of plastic polymer can be obtained.

It is not only possible to dissolve many of these polymers in suitable solvents but, in addition, the solution or dispersion resulting from carrying out the polymerization in solution or emulsion may be employed in a variety of ways, for example, as rubber substitutes for the preparation of dipped, coated, extruded or impregnated articles or films may be cast from the liquid compositions. The numerous processes described in U. S. Patent 1,967,863 may be applied to the product of this invention.

Many of the interpolymers, such as that described in Example 1, have excellent softness and pliability which makes them especially suitable for certain uses. For example, they may be calendered onto cloth for the preparation of coated fabrics of good quality, since they retain the properties of long life and resistance to various solvents and reagents which are characteristic of polymers of pure chloroprene. It is particularly pointed out that products of the type produced by Example 1 are adapted to be used in the form of solutions of the uncured polymer for coating and impregnating by the processes set forth in the patent last mentioned above. Further, the interpolymers may be compounded with reenforcing agents such as carbon black, to produce further useful products.

The interpolymers of this invention may also be further treated to produce other products, also useful in a variety of ways. By way of example, the interpolymers may be halogenated or reacted with hydrohalogens under a variety of conditions, i. e. in solution, in the gaseous state or in the liquid state.

It is apparent that many widely different embodiments of this invention may be made without departing from the spirit and scope thereof and, therefore, it is not intended to be limited except as indicated in the appended claims.

We claim:

1. A polymer of chloro-2-butadiene-1,3 obtainable by polymerizing chloro-2-butadiene-1,3 in the presence of a polymerizable alpha, beta-unsaturated compound of the group consisting of alpha, beta-unsaturated aldehydes, ketones, acids, their esters, anhydrides, and nitriles.

2. An elastic polymer of chloro-2-butadiene-1,3 obtainable by polymerizing chloro-2-butadiene-1,3 in the presence of a polymerizable alpha, beta-unsaturated compound of the group consisting of alpha, beta-unsaturated aldehydes, ketones, acids, their esters, anhydrides, and nitriles.

3. A plastic polymer of chloro-2-butadiene-1,3 obtainable by polymerizing chloro-2-butadiene-1,3 in the presence of a polymerizable alpha, beta-unsaturated compound of the group consisting of alpha, beta-unsaturated aldehydes, ketones, acids, their esters, anhydrides, and nitriles.

4. A product obtainable by partially polymerizing chloro-2-butadiene-1,3 in the presence of a polymerizable alpha, beta-unsaturated compound of the group consisting of alpha, beta-unsaturated aldehydes, ketones, acids, their esters, anhydrides, and nitriles, then separating a plastic mass from the unpolymerized material, and thereafter heating the plastic mass at about 125° C. until cured.

5. The process which comprises polymerizing chloro-2-butadiene-1,3 in the presence of a polymerizable alpha, beta-unsaturated compound of the group consisting of alpha, beta-unsaturated aldehydes, ketones, acids, their esters, anhydrides, and nitriles.

6. The process which comprises completely polymerizing chloro-2-butadiene-1,3 in the presence of a polymerizable alpha, beta-unsaturated compound of the group consisting of alpha, beta-unsaturated aldehydes, ketones, acids, their esters, anhydrides, and nitriles.

7. The process which comprises partially polymerizing chloro-2-butadiene-1,3 in the presence of a polymerizable alpha, beta-unsaturated compound of the group consisting of alpha, beta-unsaturated aldehydes, ketones, acids, their esters, anhydrides, and nitriles, and then separating a plastic mass from the unpolymerized material.

8. The process which comprises partially polymerizing chloro-2-butadiene-1,3 in the presence of a polymerizable alpha, beta-unsaturated compound of the group consisting of alpha, beta-unsaturated aldehydes, ketones, acids, their esters, anhydrides, and nitriles, then separating a plastic mass from the unpolymerized material, and thereafter heating the plastic mass at about 125° C. until cured.

9. The process which comprises dispersing, in water, chloro-2-butadiene-1,3 and a polymerizable alpha, beta-unsaturated compound of the group consisting of alpha, beta-unsaturated aldehydes, ketones, acids, their esters, anhydrides, and nitriles, and thereafter polymerizing the chloro-2-butadiene-1,3 in the dispersed state.

10. The process which comprises polymerizing chloro-2-butadiene-1,3 in the presence of a polymerizable alpha, beta-unsaturated compound of the group consisting of alpha, beta-unsaturated aldehydes, ketones, acids, their esters, anhydrides, and nitriles, and in the presence of a solvent for the two materials.

11. The process which comprises dispersing, in water, chloro-2-butadiene-1,3 and a polymerizable alpha, beta-unsaturated compound of the group consisting of alpha, beta-unsaturated aldehydes, ketones, acids, their esters, anhydrides, and nitriles, then polymerizing the chloro-2-butadiene-1,3 in the dispersed state, and thereafter separating the polymer from the dispersing medium.

12. The process which comprises polymerizing chloro-2-butadiene-1,3 in the presence of a polymerizable alpha, beta-unsaturated compound of the group consisting of alpha, beta-unsaturated aldehydes, ketones, acids, their esters, anhydrides, and nitriles, and in the presence of a solvent for the two materials, and then separating the polymer from the solvent.

13. A polymer of a halogen-2-butadiene-1,3 obtainable by polymerizing a halogen-2-butadiene-1,3 in the presence of a polymerizable alpha, beta-unsaturated compound of the group consisting of alpha, beta-unsaturated aldehydes, ketones, acids, their esters, anhydrides, and nitriles.

14. The process which comprises polymerizing halogen-2-butadiene-1,3 in the presence of a polymerizable alpha, beta-unsaturated compound of the group consisting of alpha, beta-unsaturated aldehydes, ketones, acids, their esters, anhydrides, and nitriles.

15. A polymer of a halogen-2-butadiene-1,3 obtainable by polymerizing a halogen-2-butadiene-1,3 in the presence of a low molecular weight polymerizable alpha, beta-unsaturated compound of the group consisting of alpha, beta-unsaturated aldehydes, ketones, acids, their esters, anhydrides, and nitriles.

16. A polymer of chloro-2-butadiene-1,3 obtainable by polymerizing chloro-2-butadiene-1,3 in the presence of a low molecular weight polymerizable alpha, beta-unsaturated compound of the group consisting of alpha, beta-unsaturated aldehydes, ketones, acids, their esters, anhydrides, and nitriles.

17. A polymer of chloro-2-butadiene-1,3 obtainable by polymerizable chloro-2-butadiene-1,3 in the presence of a polymerizable compound containing the acrylic radical.

18. A polymer of chloro-2-butadiene-1,3 obtainable by polymerizing chloro-2-butadiene-1,3 in the presence of a polymerizable alkyl vinyl ketone.

19. A polymer of chloro-2-butadiene-1,3 obtainable by polymerizing chloro-2-butadiene-1,3 in the presence of a polymerizable alpha, beta-unsaturated aldehyde.

20. A polymer of chloro-2-butadiene-1,3 obtainable by polymerizing chloro-2-butadiene-1,3 in the presence of acrylic nitrile.

21. A polymer of chloro-2-butadiene-1,3 obtainable by polymerizing chloro-2-butadiene-1,3 in the presence of methyl vinyl ketone.

22. A polymer of chloro-2-butadiene-1,3 obtainable by polymerizing chloro-2-butadiene-1,3 in the presence of croton aldehyde.

23. The process for polymerizing chloro-2-butadiene-1,3 which comprises exposing a solution of acrylic nitrile in chloro-2-butadiene-1,3 to the light from a Cooper-Hewitt lamp.

24. The process for polymerizing chloro-2-butadiene-1,3 which comprises heating a mixture comprising chloro-2-butadiene-1,3 methyl vinyl ketone and a polymerization catalyst.

25. The process which comprises dispersing, in water, a solution of croton aldehyde in chloro-2-butadiene-1,3 and then polymerizing the chloro-2-butadiene-1,3 in the dispersed state.

26. A dispersion obtainable by dispersing, in water, chloro-2-butadiene-1,3 and a polymerizable alpha, beta-unsaturated compound of the group consisting of alpha, beta-unsaturated aldehydes, ketones, acids, their esters, anhydrides, and nitriles, and thereafter polymerizing the chloro-2-butadiene-1,3 in the dispersed state.

WALLACE H. CAROTHERS.
ARNOLD M. COLLINS.
JAMES E. KIRBY.